No. 722,407. PATENTED MAR. 10, 1903.
F. N. ISHAM.
GRAIN AND FERTILIZER DRILL.
APPLICATION FILED MAR. 25, 1902.
NO MODEL. 4 SHEETS—SHEET 1.
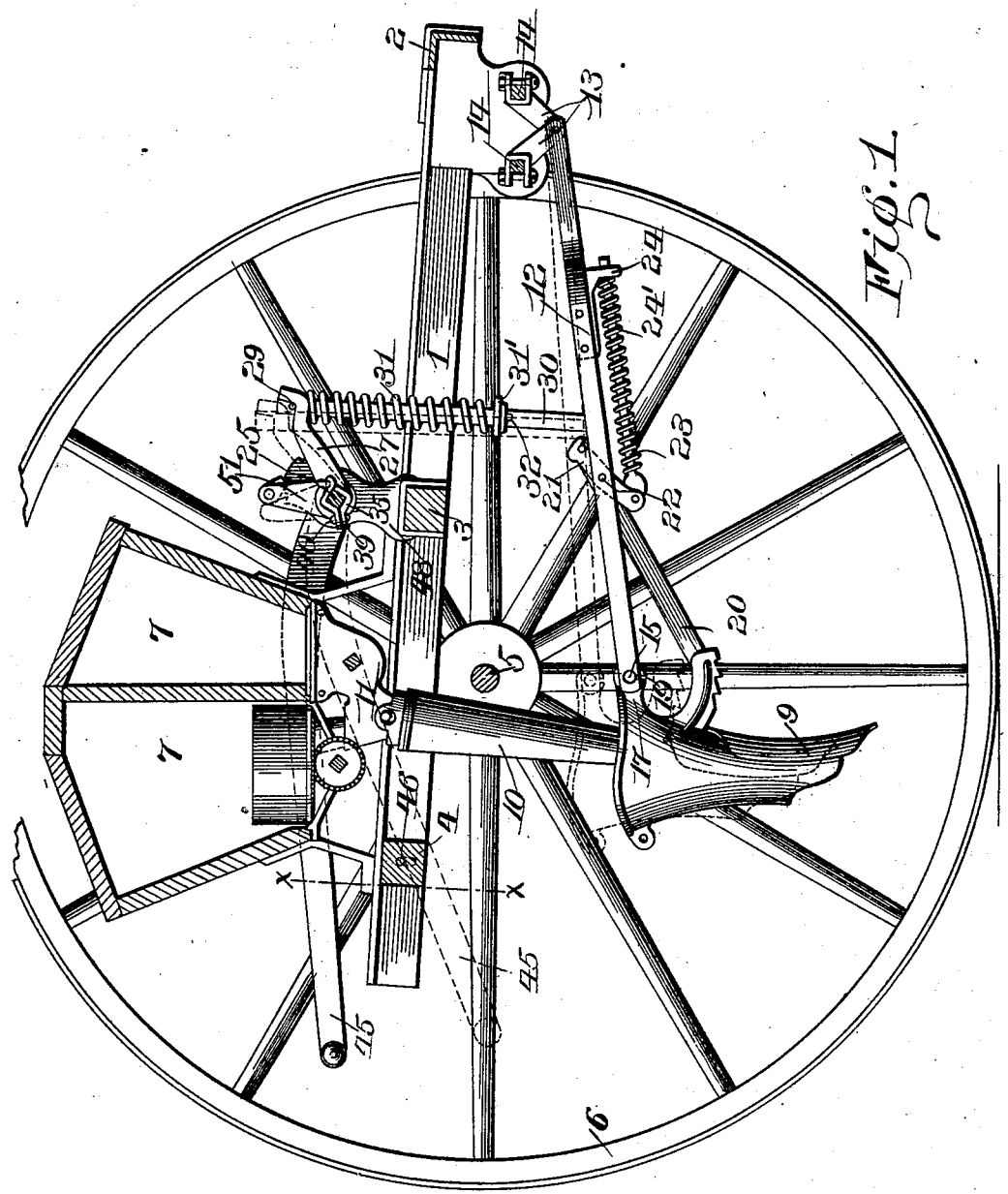
Witnesses.
Inventor.
Attorney.

No. 722,407. PATENTED MAR. 10, 1903.
F. N. ISHAM.
GRAIN AND FERTILIZER DRILL.
APPLICATION FILED MAR. 25, 1902.
NO MODEL. 4 SHEETS—SHEET 2.
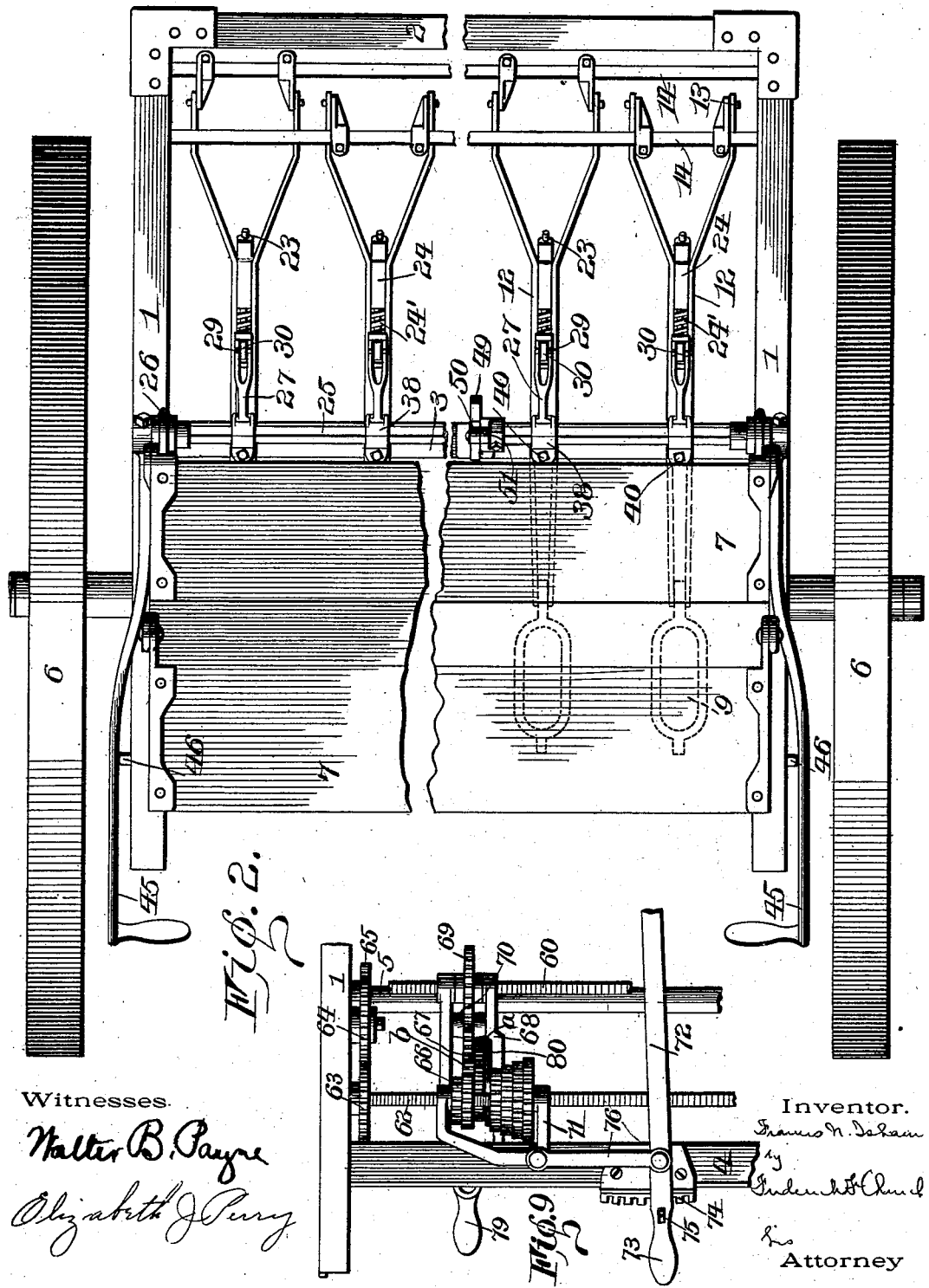
Witnesses
Walter B. Payne
Elizabeth J. Perry
Inventor.
Francis N. Isham
Attorney No. 722,407. PATENTED MAR. 10, 1903.
F. N. ISHAM.
GRAIN AND FERTILIZER DRILL.
APPLICATION FILED MAR. 25, 1902.
NO MODEL. 4 SHEETS—SHEET 3.
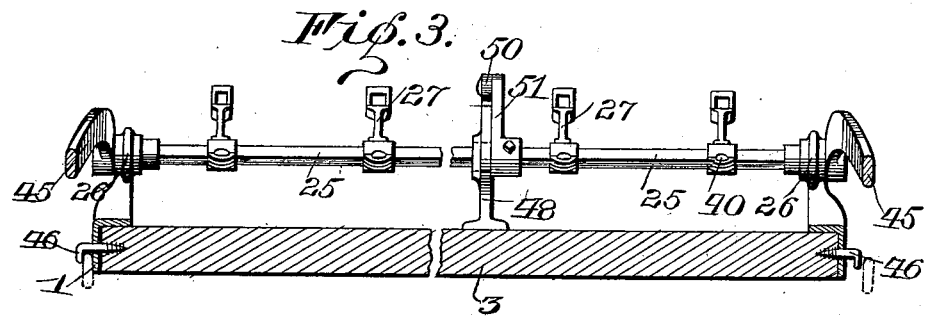
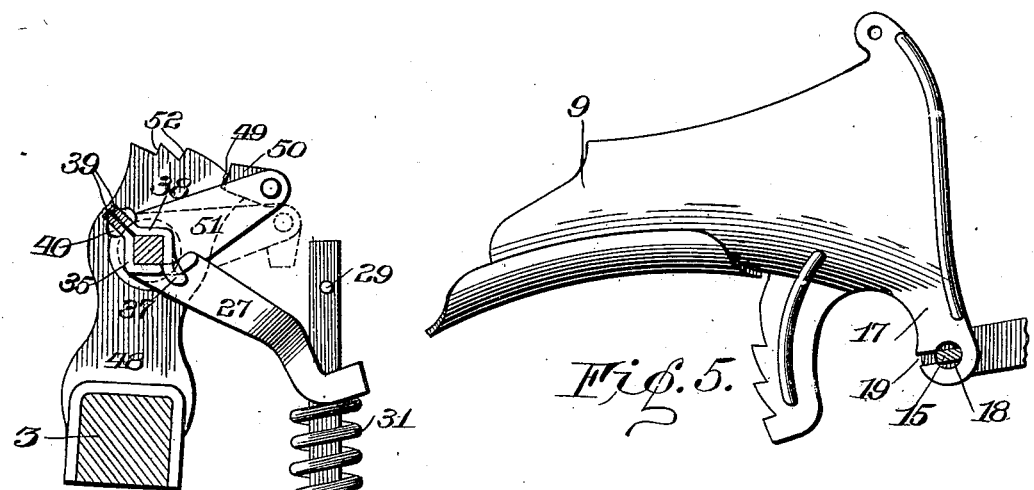
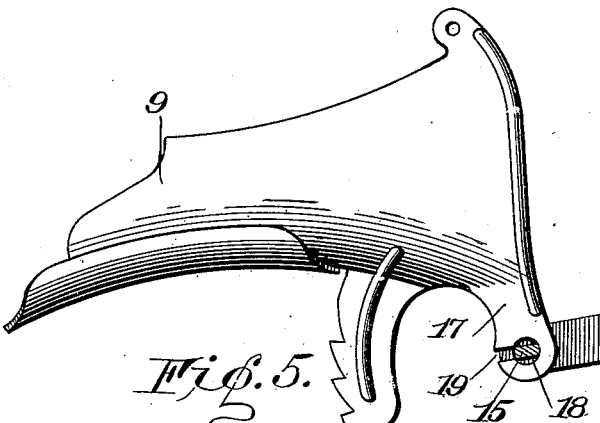
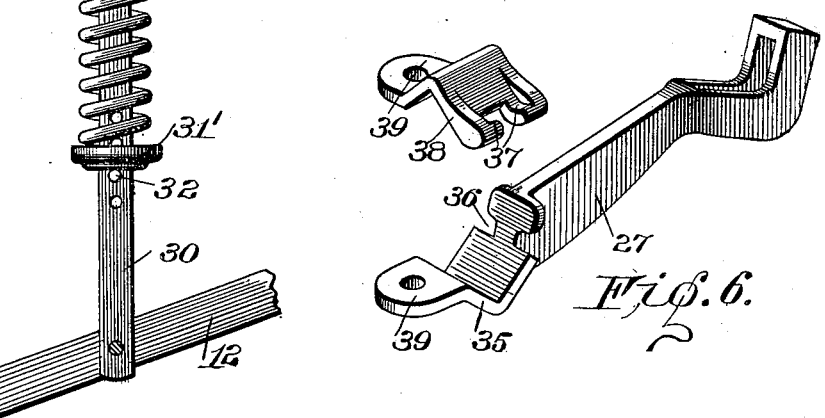
Witnesses.
Walter B. Payne
Elizabeth J. Perry
Inventor.
Francis N. Isham
Frederick S. Church
by
Attorney
THE NORRIS PETERS CO., PHOTO-LITHO., WASHINGTON, D. C.

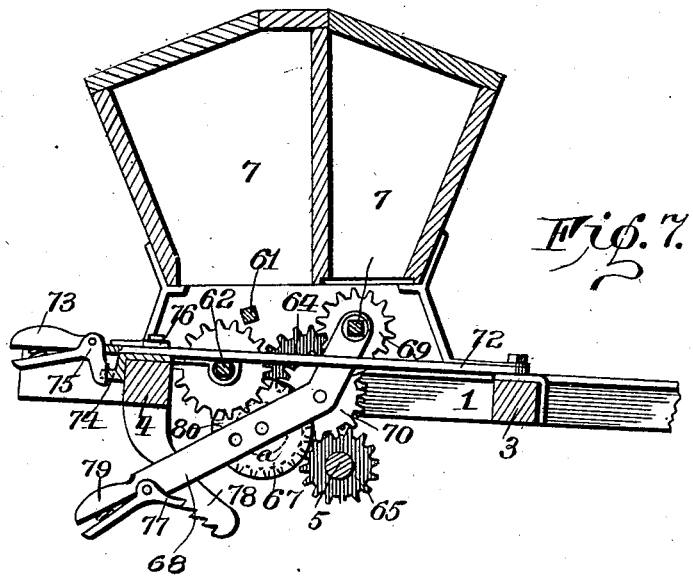
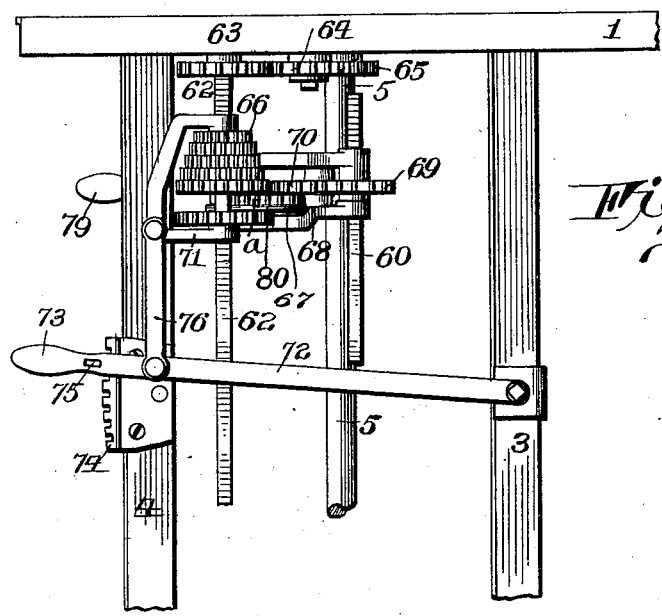

UNITED STATES PATENT OFFICE.

FRANCIS N. ISHAM, OF AVON, NEW YORK.

GRAIN AND FERTILIZER DRILL.

SPECIFICATION forming part of Letters Patent No. 722,407, dated March 10, 1903.

Application filed March 25, 1902. Serial No. 99,881. (No model.)

*To all whom it may concern:*

Be it known that I, FRANCIS N. ISHAM, of Avon, in the county of Livingston, State of New York, have invented certain new and useful Improvements in Grain and Fertilizer Drills; and I do hereby declare the following to be a full, clear, and exact description of the same, reference being had to the accompanying drawings, forming a part of this specification, and to the reference characters marked thereon.

My present invention relates to that class of agricultural machines known as "grain and fertilizer drills," and has for its object to provide suitable operating devices between the seed and fertilizer feeding mechanism and the driving-shaft, whereby the speed of the former parts may be varied, and also means for adjusting said driving devices.

To these and other ends the invention consists in certain improvements in construction and combination of parts, all as will be hereinafter fully described, the novel features being pointed out in the claims at the end of the specification.

In the drawings, Figure 1 is a longitudinal sectional view of a grain and fertilizer drill embodying my invention. Fig. 2 is a top plan view thereof. Fig. 3 is a rear view of the hoe-elevating shaft, taken on the line $x\ x$ of Fig. 1. Fig. 4 is an enlarged side elevation of the hoe-locking mechanism. Fig. 5 is a similar view, partly in section, of one of the hoes, showing the method of attaching the latter. Fig. 6 is a detached perspective view of one of the elevating-arms. Fig. 7 is an enlarged longitudinal sectional view of a portion of the main frame and hopper, showing a side elevation of the driving devices for operating the seed-feeding mechanism. Fig. 8 is a top plan view of said devices, and Fig. 9 is a similar view showing the parts in a different position of adjustment.

Similar reference characters in the several figures indicate similar parts.

In illustrating the various features of my invention I have shown them applied to the usual form of grain and fertilizer drills embodying a frame composed of the side pieces 1, connected at their forward ends by a bar 2, in rear of which are two cross-bars 3 and 4. The frame is supported upon the usual driving-axle 5, the ends of which are carried in the wheels 6, and above the frame is arranged the hopper 7. The hoes 9 are located beneath the hopper, and the seed and fertilizer are conducted thereto by tubes 10, attached at their upper ends to the frame, forming a portion of the distributing mechanism, (indicated by 11,) said hoes being connected by drag-bars 12 to the arms 13 on the drag-shafts 14, located at the forward end of the frame. The drag-bars 12 are arranged in pairs for each hoe, and at their rear ends each pair is connected by a stud 15, which in the present instance is flattened upon its opposite sides and arranged with the planes of said sides extending in line with the drag-bars, being prevented from turning therein by means of elongated slots or apertures provided in said bars corresponding to the cross-section of the studs and through which the ends of the latter extend, as will be understood. The hoe is provided at its upper end with a web 17, provided with a perforation or aperture 18, forming an eye from which leads a downwardly-extending slot 19. This arrangement of the parts permits the hoe to be attached to the drag-bar when elevated into the position shown in Fig. 5, when the stud may be passed through the slot 19 and the hoe revolved to the normal position, (shown in full lines in Fig. 1,) securely locking it against removal. The hoe is further secured by a link 20, attached to one end of a lever 21, pivoted at 22 and connected at its opposite end to a rod 23, movably supported in a guide 24, between which and the end of the lever is a spring 24', serving to hold the parts in the normal position, but permitting the hoe to revolve on the stud 15 when the latter engages an obstruction with sufficient force to compress the spring.

In order to raise the hoes out of operative position, I provide an elevating device embodying a shaft 25, journaled in brackets 26, mounted on the sides 1 of the frame and having thereon a series of levers or arms 27, apertured at their outer ends and recessed at their upper sides to receive the pins 29 in the elevating-bars 30, attached to the drag-bars and extending through said apertures. Springs 31 are placed on the bars 30 beneath the levers 27, and as the latter are below the pins 29 they may be moved downwardly to compress the springs and force the hoes into the ground. The lower ends of the springs rest upon washers 31', which may be adjusted to vary the tension by arranging the pins 32 in the several apertures shown in the bars. The shaft 25 is usually rectangular in cross-section, and to adapt the levers or arms 27 for ready attachment I construct them, preferably, of separate interlocking pieces. At the rear end of the arms 27 is a head 35, having an angular recess adapted to fit two proximate faces of the shaft and provided with notches or recesses 36 on each side of the arm to receive fingers 37 on a corresponding angular cap-piece 38, adapted to engage the opposite faces of the shaft, the said head and cap-piece having on their rear sides perforated flanges 39, through which a bolt 40 may be passed to secure the parts rigidly. This arrangement permits an arm to be easily attached at any desired point on the shaft, and it is particularly advantageous upon machines of this character, as a broken arm may be easily replaced without removing the shaft from the frame or disturbing the other arms. The ends of the fingers 37 are curved upward slightly at their proximate sides and in applying the arm they are engaged in the notches, when the parts may be separated sufficiently to be slipped over the shaft, when they may afterward be secured by the bolt 40. The shaft 25 may be operated from the rear of the machine and from either side thereof by lever-arms 45 and the hoes lowered or elevated as desired, and when in the latter position they may also be locked by engaging either of the levers beneath projections or hooks 46 on the side portions 1 of the frame. The levers are made of malleable or wrought iron or steel, and their outer ends are offset slightly beyond the ends of the shaft 25, so that as they are engaged beneath the hooks 46 a slight spring tension is imparted to the levers, which normally holds them out of alinement with the hooks. In raising the hoes the operator grasps either handle and moving it downward forces it inwardly beneath the hook, where it is retained, the spring in the lever moving it beyond the hook when either of the levers is operated to lower the hoes.

In order to exert a downward pressure on the hoes when in the operative position, I provide means for locking the shaft 25 with the arms 27 thrown downward to compress the springs 31, which in the present instance embodies a plate or bracket 48, mounted centrally on the cross-bar 3 and forming a central bearing for the shaft, as shown. The top of the bracket extends above the shaft and is provided with a rack having at the forward edge a notch 49, adapted to be engaged by a pawl 50, pivoted on an arm 51, connected to said shaft, all as shown in full lines in Fig. 4. At the rear side of the bracket are also provided notches 52, arranged opposite the notches 49, adapted to be engaged by the pawl 50, as shown in Fig. 1, to lock the shaft when it is desired to hold the hoes above the surface of the ground. The pawl 50 is pivotally attached to the arm 51, and as the shaft is revolved the pawl is carried over the rack, engaging the notches, as above described, until its end passes off the bracket, allowing it to gravitate to the position shown in dotted lines in Fig. 4, when the shaft may be revolved in the opposite direction, with the pawl following over the rack to engage therewith and secure the parts in the desired position. By employing this locking device the lever-arms 45 may be adjusted to extend in a substantially vertical position for the convenience of the operator when riding upon the machine, and the projections or hooks 46 might in such a case be dispensed with or applied to the ends of the hopper.

In order to make the drawings clear, I have omitted from Figs. 1 and 2 the illustration of the operating devices arranged between the seeding and fertilizer-distributing mechanisms and the driving-axle and have shown these features in detail views in Figs. 7, 8, and 9. The seeding and fertilizer-feeding mechanism may be of the usual or any preferred construction, arranged in the hopper and adapted to be operated by the driven or feeding shafts 60 and 61, respectively. Extending across the frame and journaled in the side pieces 1 and slightly in rear of the driving axle or shaft 5 is a driving-shaft 62, having at one end a gear-wheel 63, meshing with a gear-wheel 64, journaled on a stud on the frame, and in turn meshing with a pinion 65, attached to the driving-axle 5 and affording means for causing the rotation of the shaft 62 in the desired direction. The rotary movement is transferred from the latter to the feeding-shaft 60 by means of gear-wheels, and in order that various speeds may be obtained in the rotation of said shaft I arrange a series of differential gear-wheels (indicated by 66) which are capable of longitudinal movement, permitting one or another to be shifted into alinement with either portion of a double pinion 67, carried in a yoke 68, mounted on the shaft 60, and having the arms extending on each side of a gear-wheel 69 on said shaft. The pinion 67 embodies the two portions of larger and smaller diameter, (indicated by $a$ and $b$, respectively,) and also mounted on the yoke is an idler-pinion 70, arranged between the portion $b$ of the pinion 67 and the gear-wheel 69. The driving-shaft 62 is preferably angular in cross-section, the gears 66 being provided with corresponding apertures at their centers. They are retained in position on the shaft by a frame 71, having the ends embracing the outermost of said gear-wheels, but spaced such a distance apart that any two of the gear-wheels may be separated sufficiently to permit the portion $a$ of the pinion 67 to operate between them in case it is desired to perform the driving operation through the portion $b$ of said pinion, as will be further described. The means for shifting the rank of gear-wheels 66 consists of a lever 72, pivoted to the cross-bar 3 and having the handle 73 extending in rear of the cross-bar 4, on which latter is arranged a rack 74, adapted to be engaged by a pawl or dog 75, arranged on the handle and operating to secure the lever in adjusted position. 76 indicates a link connecting the lever with the yoke 71. Owing to the difference in the sizes of the gear-wheels on the driving-shaft, it is desirable to provide means for adjusting the pinion 67 relatively to said shaft to permit either of the portions $a$ or $b$ to be moved into engagement with said gear-wheels. To accomplish this purpose, I journal the yoke 68 on the shaft 60 and secure it in the adjusted position by means of a pawl 77, which engages notches or ratchet-teeth formed upon an arm 78, projecting from the lower side of the cross-bar 4. One end of the pawl extends in close proximity to the handle 79 on the yoke, whereby it may be easily operated to release the latter.

The operation of the above mechanism will be readily understood. When it is desired to alter the speed of the feeding-shaft, the yoke 68 is first moved downwardly, carrying the pinion 67 out of the path of the gear-wheels 66. The latter may then be adjusted on the shaft 62 by means of the lever 72 to position the desired gear-wheel opposite the portion $a$ of the pinion 67, after which operation the yoke 68 may be adjusted toward the shaft 62 to cause the gears to properly mesh, and in this position the gear-wheel is prevented from independent lateral movement, being held at one side between the flange 80 at one side of the pinion 67 and at the other side by one of the arms of the frame 71. If it is desired to operate the seeding-shaft through the smaller portion $b$ of the pinion 67, the gear-wheels at one side of the selected gear-wheel are moved apart sufficiently to permit the portion $a$ and the flange 80 of said pinion to extend between them, as illustrated particularly in Figs. 8 and 9.

While I have described but one operating mechanism, and that employed for driving the seeding-shaft, it will be understood that this mechanism may be duplicated and the additional set employed for operating the driven shaft 61 of the fertilizer-distributing mechanism.

The various features I have shown and described combine to provide a grain and fertilizer drill in which the various operating mechanisms may be controlled by the operator as he follows at the rear of the machine, and the hoe-elevating devices being arranged entirely in front of the hopper leave the rear of the frame unobstructed, allowing the gearing devices to be under the perfect control of the operator at all times. The construction of the several parts whereby they may be easily applied facilitates setting up the machine and also replacing the parts in making repairs.

While I have not claimed herein the hoe elevating and adjusting devices nor the particular construction of these and other parts of the invention, I do not relinquish these features, but reserve them to form the subject-matter of a future application.

I claim as my invention—

1. In an agricultural implement, the combination with a frame having a hopper, a driven shaft, and feeding devices operated thereby, of a driving-shaft, a pinion operating the driven shaft, and an adjustable support carrying said pinion, a plurality of gear-wheels arranged on the driving-shaft, a frame embracing the several gears, and means for moving the frame to adjust the gear-wheels longitudinally on the shaft relatively to the pinion.

2. In an agricultural implement, the combination with a frame having a hopper, a driven shaft and feeding devices operated thereby, of a driving-shaft, a pinion operating the driven shaft, an adjustable support carrying said pinion, and a plurality of gear-wheels arranged on the driving-shaft, a frame extending over the ends of said plurality of gear-wheels, an operating-lever for moving them longitudinally of the shaft, and means for locking the frame in adjusted position.

3. In an agricultural implement, the combination with a frame having a hopper, a driven shaft and feeding devices operated thereby, of a double pinion operating the shaft, composed of gear-wheels of different diameters, an adjustable support carrying said pinion, and a driving-shaft, a plurality of gear-wheels thereon, a frame movable longitudinally of the shaft having the arms extending over the gear-wheels and permitting their limited independent movement on the shaft, and devices for adjusting the frame.

4. In an agricultural implement, the combination with a frame having a hopper, a driven shaft, and feeding devices operated by the latter, of a double pinion operating the driven shaft composed of the large and small gear-wheels and provided with a flange at one side of the larger gear-wheel, an adjustable support for said pinion, a driving-shaft, and a frame movable longitudinally thereof having arms, a plurality of differential gears having a limited longitudinal movement between said arms, means for operating the frame to shift the gear-wheels relative the pinion and locking devices securing the frame.

5. In an agricultural implement, the combination with a frame having a hopper, a driven shaft, and feeding devices operated by the latter, of a pinion operating the driven shaft, a movable yoke carrying said pinion and provided with a pawl and a bar on the frame having ratchet-teeth with which said pawl coöperates, a driving-shaft, a plurality of differential gear-wheels thereon, a frame having arms embracing the gears, and a lever for shifting the frame to move all of the gears relative the pinion.

6. In an agricultural machine, the combination with a main frame having a hopper provided with feeding devices, a feeding-shaft operating the latter, and a driving-shaft, of a plurality of gears arranged on the driving-shaft, a frame embracing the gear-wheels, a lever for moving the frame to shift the gears longitudinally on the shaft, and means for locking the frame in adjusted position, a yoke having a pinion journaled therein and adjustable relative the driving-shaft, and operating connections between the pinion and the driven shaft.

FRANCIS N. ISHAM.

Witnesses:
   ELIZABETH J. PERRY,
   ELIZABETH SQUIER.